M. E. GRISWOLD.
JUVENILE WAGON.
APPLICATION FILED MAR. 3, 1919.
1,376,873.
Patented May 3, 1921.
2 SHEETS—SHEET 1.
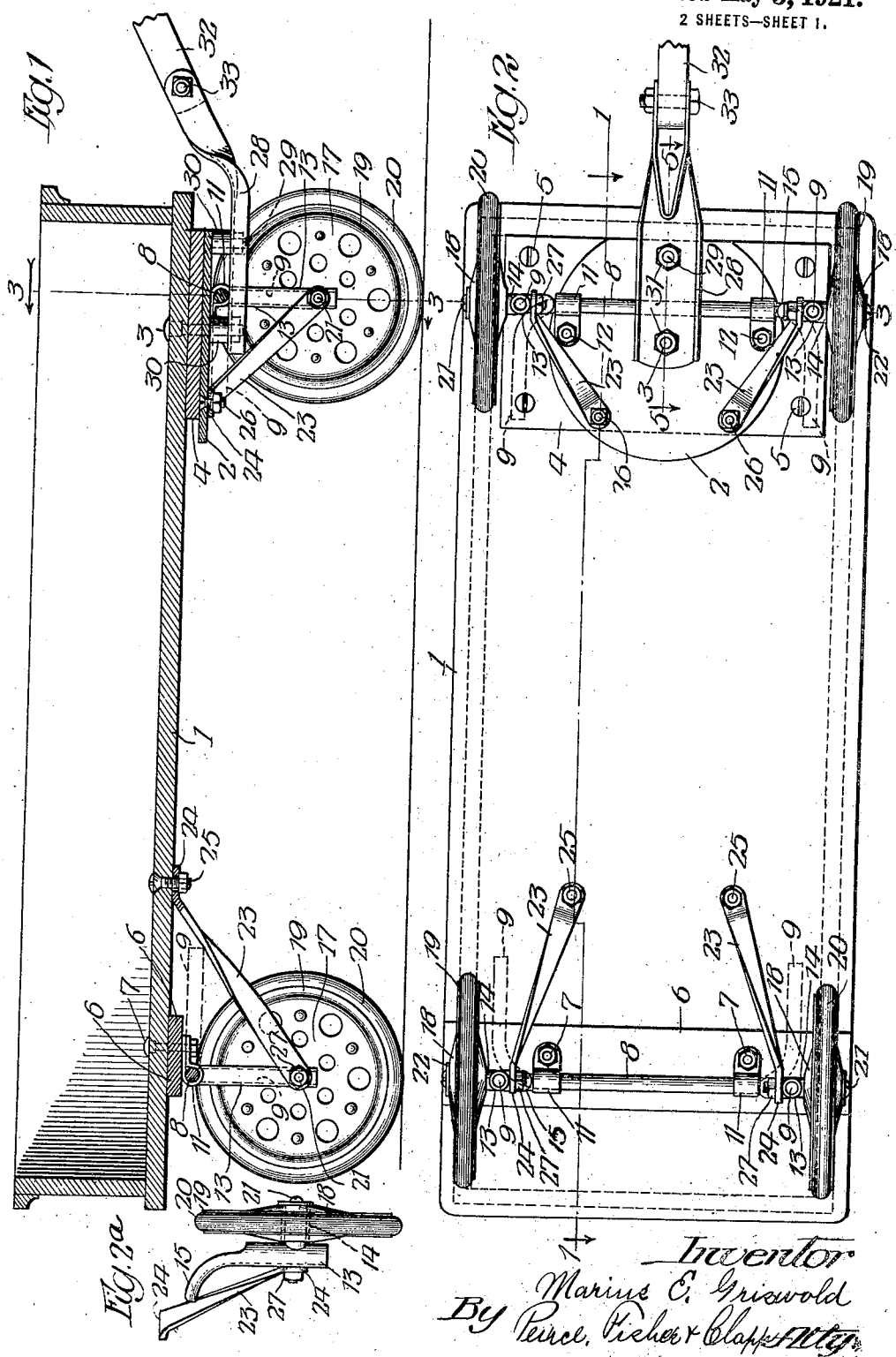
Inventor
Marius E. Griswold
By Peirce, Fisher & Clapp Attys.

M. E. GRISWOLD.
JUVENILE WAGON.
APPLICATION FILED MAR. 3, 1919.
1,376,873.
Patented May 3, 1921.
2 SHEETS—SHEET 2.
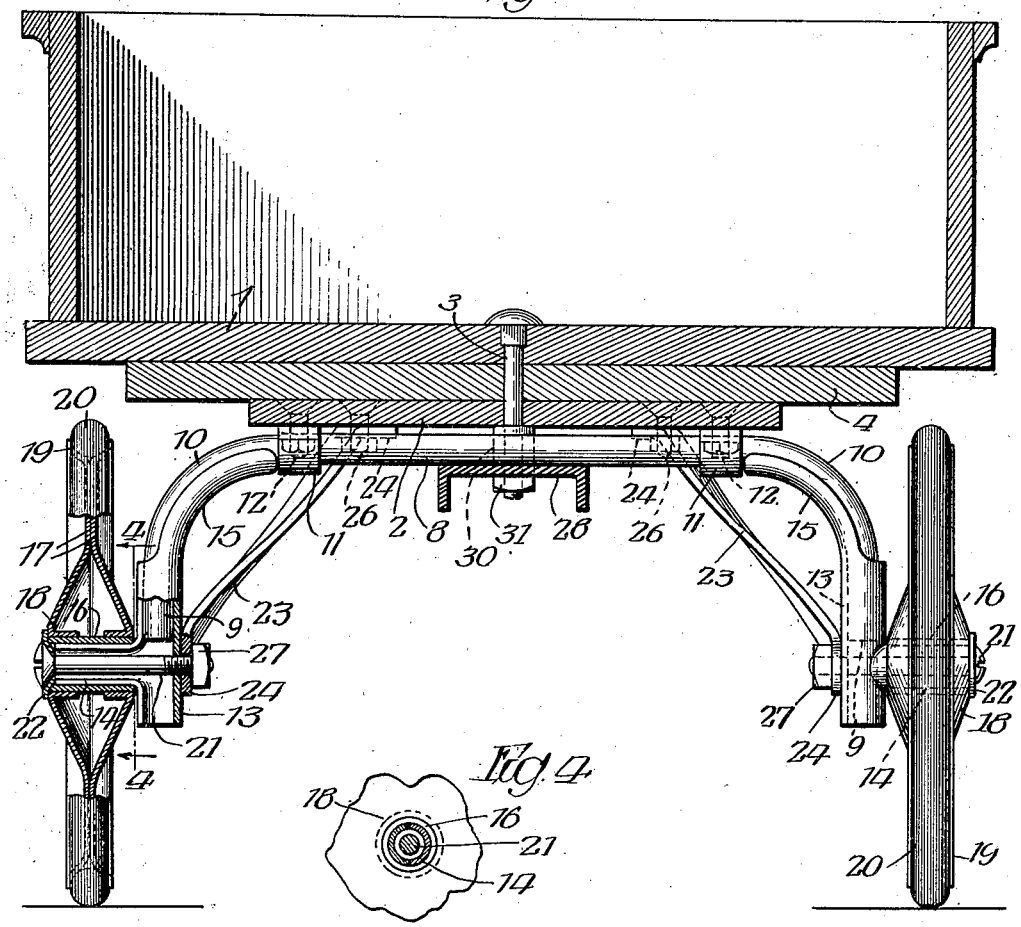
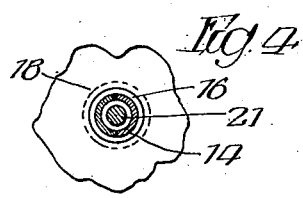
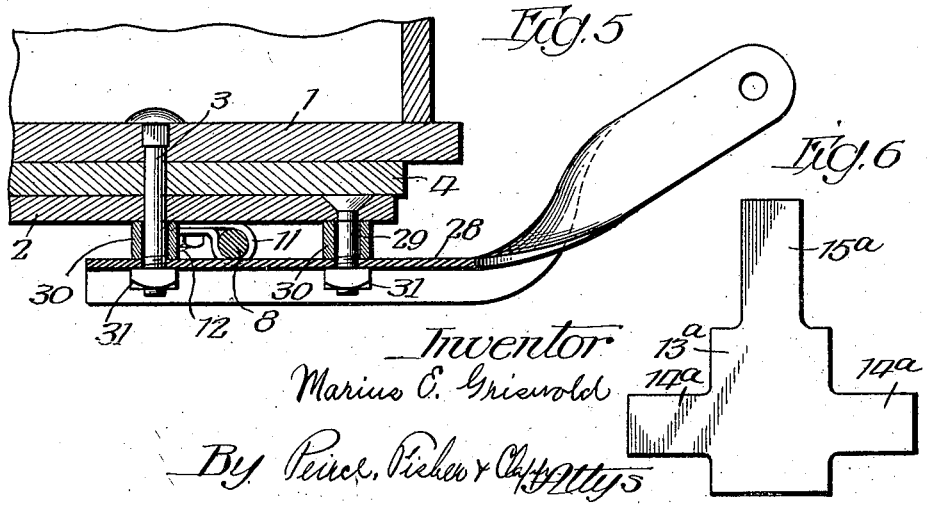
Inventor
Marius E. Griswold
By Pierce, Fisher & Cl. Attys

UNITED STATES PATENT OFFICE.

MARIUS E. GRISWOLD, OF BURLINGTON, IOWA.

JUVENILE WAGON.

1,376,873.

Specification of Letters Patent.    Patented May 3, 1921.

Application filed March 3, 1919. Serial No. 280,262.

*To all whom it may concern:*

Be it known that I, MARIUS E. GRISWOLD, a citizen of the United States, and a resident of Burlington, Des Moines county, Iowa, have invented certain new and useful Improvements in Juvenile Wagons, of which the following is a specification.

The present invention relates to coaster wagons and the like and more particularly to the axle construction and seeks to provide a simple, strong axle construction which can be readily knocked down for shipment and set up for use. The invention consists in the features herinafter set forth, illustrated in the preferred form in the accompanying drawings, and more clearly pointed out in the appended claims.

In the drawing, Figure 1 is a vertical longitudinal section on line 1—1 of Fig. 2; Fig. 2 is an inverted plan; Fig. 3 is a vertical cross section on line 3—3 of Figs. 1 and 2; Fig. 4 is a detail section on line 4—4 of Fig. 3; Fig. 5 is a detail section on line 5—5 of Fig. 2; and Fig. 6 is a view of the blank from which a portion of the improved axle construction is formed; Fig. 2$^a$ is a detail of the axle.

The frame or body 1 of the wagon may be of any suitable construction, but is preferably in the form of a seat board or, as shown, of a box body. It is provided at its forward end with a turn-plate 2 swiveled thereto by a bolt 3, and the turn-plate and wagon frame or body constitute supports for the front and rear axles respectively. Preferably, as shown, the turn-plate 2 bears against a block 4 secured to the underside of the wagon body or frame near its forward end by screws 5. Preferably also a transverse bar 6 is secured to the underside of the body near its rear end by bolts 7 which also serve to secure the upper sections of the rear axle in position.

The axles are arched and comprise upper sections secured to the wagon frame or body 1 and the turn-plate 2, and separate depending wheel-carrying sections or brackets, one for each wheel, and which are removably mounted on the upper sections. The upper axle-sections 8 are preferably formed of round metal rods of inverted U-shape, the transverse portions of which are hinged to the turn-plate 2 and the transverse bar 6, and the ends of which form down-turned or depending arms 9 with intermediate curved portions 10. The hinge connections comprise pairs of bearing eyes 11 in which the transverse portions 8 are journaled and which are secured to the lower faces of the transverse bar 6 and the turn-plate 2 by the bolts 7 and by bolts 12 respectively.

The upper axle-sections are thus adapted to swing or turn in the bearing eyes so that the arms 9 may depend vertically in operative position, as shown in full lines in the drawings, or be folded to a horizontal position in compact relation to the wagon body or frame for shipment, as indicated in dotted lines in Figs. 1 and 2. The bearing eyes 11 are preferably formed of bent sheet metal strips, the perforated lapped ends of which engage the ends of the bolts 7 and 12, and the eyes are arranged adjacent the curved portions of the folding axle-sections to hold the same against lateral movement.

The wheel-carrying axle-sections or brackets 13 are tubular and telescopically engage or slidably fit over the arms 9 of the upper or folding axle-sections, and the brackets are provided with short wheel spindles 14 at their lower ends which are preferably integral there-with. Preferably the brackets are pressed from a cross-shaped sheet metal blank, such as shown in Fig. 6. The main body 13$^a$ of the blank forms the vertical tubular portion of the bracket, the projections 14$^a$ thereof form the integral, laterally projecting, tubular spindle 14, and the narrow upper end 15$^a$ of the blank forms a curved upper terminal 15 for the bracket which is semi-circular in cross-section and which is shaped to fit snugly upon the curved portion 10 of the folding axle-section.

The formation of each bracket provides a seam or joint which extends longitudinally along the outer side of its tubular body and along the upper and lower sides of the integral spindle, as indicated in Figs. 3 and 4. A sleeve 16 having a driving fit on the spindle strengthens the joint and the entire bracket and also forms a bearing for the wheel hub.

The wheels may be of any suitable construction. Those shown are each formed of two sheet metal disks 17 of sheet iron or steel, riveted together and shaped at their central and edge portions to form hubs 18 and seats 19 for cushion tires 20. To reduce the friction between the wheel hubs 18 and the bearing sleeves 16, the latter are preferably formed of brass. Each wheel is held in place upon the corresponding bracket by a bolt 21 which extends through the tubular spindle 14, the inner end being threaded through the body of the bracket and the outer headed end being provided with a washer 22 which overlaps the outer end of the wheel hub.

Inclined braces 23 extend from the wheel-brackets and connect the same to the wagon frame or body 1 and to the turn-plate 2. These braces are formed of flat metal bars twisted between their ends and provided with perforated terminal ears 24. The ears at the upper ends of the braces are removably secured to the frame and turn-plate by bolts 25 and 26 respectively, and the ears at their lower ends engage the inner ends of the bolts 21, being held in place thereon by nuts 27.

A flanged, sheet metal tongue-plate 28 extends beneath the upper portion 8 of the front axle and engages the lower end of the bolt 3. A bolt 29 extends between the tongue-plate and the forward portion of the turn-plate. Sleeves 30 and nuts 31 on these bolts hold the plates in spaced relation as shown in Figs. 1 and 4. The plate 28 has forwardly and upwardly extending ears to which a tongue 32 is connected by a bolt 33.

By removing the nuts on the bolts 25 and 26, the wheels, wheel-brackets and braces can be removed and the folding axle-sections turned into the positions shown in dotted lines in Figs. 1 and 2. The tongue or the tongue and tongue-plate can also be removed. The parts can then be compactly stored or shipped knocked-down. When the wagon has a box body, the removed parts can be conveniently packed therein. Moreover, the parts can be readily assembled for use.

When assembled, the inclined braces securely hold the folding axle-sections and the removable wheel-carrying brackets in operative position. The curved bracket terminals 15 which engage the curved portions 11 also aid in holding the brackets in position and brace the connected parts and the ends of the curved terminals are located closely adjacent the bearings 11 so that the axles are held against lateral movement. The means provided for mounting the wheels upon the brackets is strong and the entire axle construction, while readily knocked-down and assembled, is extremely stout and durable.

Changes may be made in the details set forth without departure from the essentials of the invention as defined in the claims.

I claim as my invention:

1. In a child's wagon, a frame or body, a turn-plate swiveled thereto, upper axle-sections mounted on said frame and turn-plate, separate depending wheel-carrying brackets removably engaging said axle sections and inclined braces detachably connecting said brackets to said frame and turn-plate, respectively.

2. In a child's wagon, a frame or body, a turn-plate swiveled thereto, arched axles comprising upper transverse sections mounted on said frame and turn-plate and separately depending axle-brackets removably fitted upon the ends of said upper sections, wheels mounted on said brackets, and means for detachably connecting said brackets to said frame and turn-plate, respectively.

3. In a child's wagon, a support, a folding axle-section hinged to said support and adapted to be down-turned in operative position, a wheel carrying axle-bracket removably engaging said axle-section and means for securing said bracket in place and for holding the same and said folding axle-section in operative position.

4. In a child's wagon, a support, a folding axle-section hinged to said support and adapted to be down-turned in operative position, a tubular axle-bracket telescopically engaging said folding axle-section, a wheel mounted on said bracket, and an inclined brace detachably connecting said bracket to said support.

5. In a child's wagon, a support, an arched axle comprising an upper transverse portion hinged to said support and having terminal arms adapted to be down-turned in operative position, separate wheel-carrying axle-brackets slidably and removably engaging said arms and braces for securing said axle-brackets upon said arms and for holding said brackets and arms in operative position.

6. In a child's wagon, a support, an arched axle comprising an upper transverse portion hinged to said support and having terminal arms adapted to be down-turned in operative position, tubular axle-brackets telescopically engaging said arms and having laterally projecting spindles on their lower ends, wheels journaled on said spindles, and inclined braces detachably connecting said brackets to said support.

7. In a child's wagon, the combination with a support, of an arched axle comprising an upper transverse portion having curved end portions and terminal arms adapted to be down-turned in operative position, tubular, wheel-carrying brackets removably fitting upon said arms and having curved, flanged ends fitting the curved portions of said transverse axle-section, and braces for holding said brackets and arms in operative position.

8. In a child's wagon, a support, a down-turned axle-section on said support, a tubular axle bracket removably fitting upon said axle-section and having an integral, tubular, wheel carrying spindle, said bracket and spindle having a longitudinally extending seam or joint and a sleeve fitted on said spindle.

9. In a child's wagon, a support, a down-turned axle-section on said support, a tubular axle-bracket removably fitting upon said axle-section and having an integral, tubular spindle, a wheel journaled on said tubular spindle, and a bolt extending through said tubular spindle for holding said wheel in place.

10. In a child's wagon, a support, a down-turned axle-section mounted on said support and having a curved upper end portion, a tubular axle-bracket removably fitting upon the lower portion of said axle-section and having a curved upper terminal engaging the curved portion of said axle-section, said bracket having a laterally projecting spindle at its lower end and a wheel journaled on said spindle.

MARIUS E. GRISWOLD.